United States Patent [19]

Trovato et al.

[11] Patent Number: 4,775,902

[45] Date of Patent: Oct. 4, 1988

[54] APPARATUS FOR RECORDING AND READING INFORMATION ON A MAGNETIC DISK WITH TRACK FOLLOWING CIRCUITRY

[75] Inventors: Antonio Trovato, Cologno Monzese; Giuseppe Picerno, Pavone C.se, both of Italy

[73] Assignee: Ing. C. Olivetti & C., S.p.A., Ivrea, Italy

[21] Appl. No.: 827,370

[22] Filed: Feb. 10, 1986

[30] Foreign Application Priority Data

Feb. 8, 1985 [IT] Italy .......................................... 67122

[51] Int. Cl.[4] ..................... G11B 21/08; G11B 21/10; G11B 5/596; G11B 5/55

[52] U.S. Cl. ...................................... 360/78; 360/77; 318/685; 318/696

[58] Field of Search ....................... 360/75, 77, 78, 97, 360/99, 105, 106, 107, 109; 318/685, 696

[56] References Cited

U.S. PATENT DOCUMENTS

| | | | |
|---|---|---|---|
| 4,157,577 | 6/1979 | Porter, Jr. et al. | 360/77 |
| 4,371,904 | 2/1983 | Brooke | 360/77 |
| 4,424,543 | 1/1984 | Lewis et al. | 360/77 |
| 4,488,187 | 12/1984 | Alaimo | 360/77 |
| 4,499,510 | 2/1985 | Harding et al. | 360/77 |
| 4,581,567 | 4/1986 | Yanagawa et al. | 360/77 |
| 4,600,868 | 7/1986 | Bryant | 360/78 |
| 4,609,953 | 9/1986 | Mizuno et al. | 360/78 |
| 4,630,145 | 12/1986 | Thompson et al. | 360/78 |

FOREIGN PATENT DOCUMENTS

| | | | |
|---|---|---|---|
| 0049948 | 4/1982 | European Pat. Off. | 360/106 |
| 58-35770 | 3/1983 | Japan | 360/77 |
| 59-177768 | 10/1984 | Japan | 360/77 |

OTHER PUBLICATIONS

IBM TDB, vol. 19, No. 4, "Head-to-Track Synchronizing Mechanism for Magnetic Disks", Porter et al., 9/76, pp. 1393-1395.

IBM TDB, vol. 20, No. 5, Schaller, 10/77, pp. 1792-1794.

Primary Examiner—Raymond F. Cardillo
Assistant Examiner—Steven R. Garland
Attorney, Agent, or Firm—Banner, Birch, McKie & Beckett

[57] ABSTRACT

The apparatus records and reads binary information on a magnetic disk having magnetizable surfaces subdivided into a plurality of concentric tracks in which the information is recorded in block form (sectors). A first electric motor rotates the magnetic disk at a substantially constant angular velocity, and a second motor (22) of stepping type is operable to position the magnetic recording and reading heads (16, 17) with respect to the recording tracks of the disk. On each track, each block of binary information contains prerecorded burst information which, when read by the corresponding magnetic head, is capable of causing micrometric rotary adjusting movements of the stepping motor to bring the magnetic head into precise alignment with the selected recording track and to hold it in that position. Thus amplitude information from two bursts either side of the center line of the track is compared (52, 55, 59, 58) to provide a signal (μSTEP) when the amplitude discrepancy exceeds a threshold, and a signal (μDIR) indicating the sense of the discrepancy. A motor control circuit (61) effects micro-steps by applying pulses to the stepping motor (22) with duty cycle modulation.

14 Claims, 5 Drawing Sheets

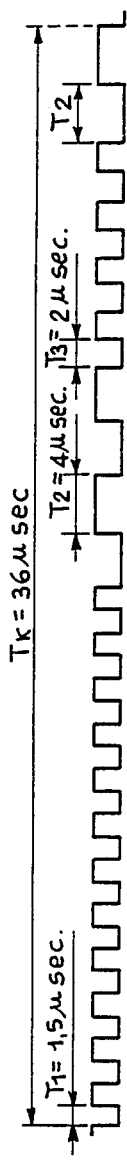
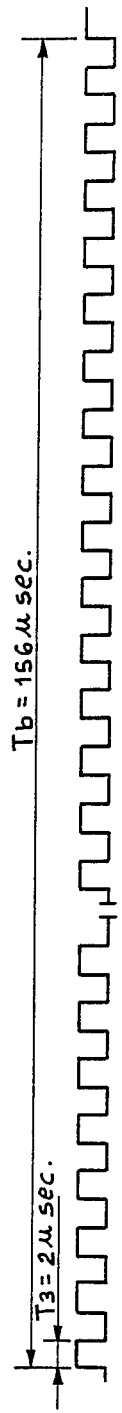
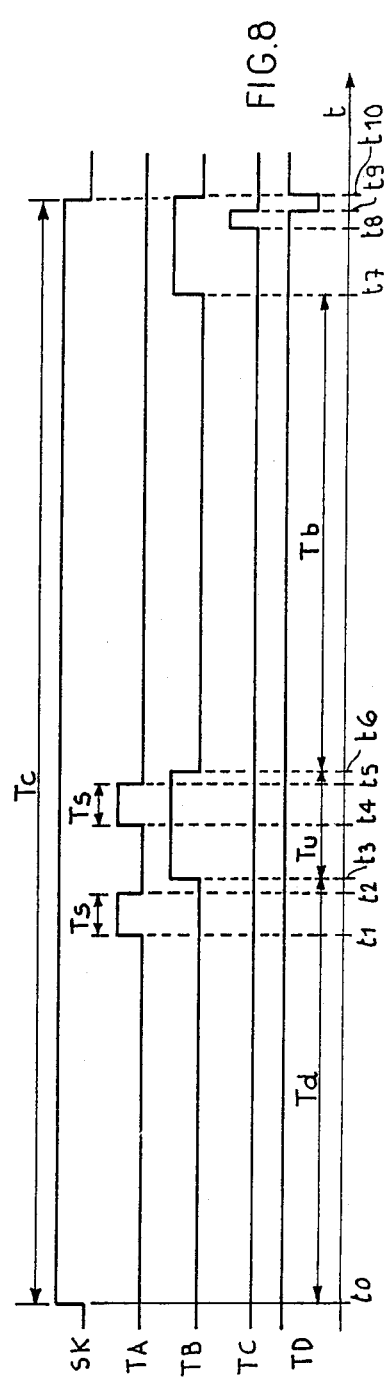

APPARATUS FOR RECORDING AND READING INFORMATION ON A MAGNETIC DISK WITH TRACK FOLLOWING CIRCUITRY

BACKGROUND OF THE INVENTION

The present invention relates to an apparatus for recording and reading information on a magnetic disk provided with a plurality of recording tracks which are concentric with respect to the axis of rotation of the disk.

The apparatus is of the type comprising means for rotating the magnetic disk, at least one magnetic head for recording and reading the information on the recording tracks, means for translating the magnetic head radially with respect to the disk and for positioning it on a selected recording track, and means for controlling the translation means.

In accordance with a known technique, in order to achieve a high degree of packing of the recording tracks, burst information is prerecorded on each of the tracks; when such information is read by the magnetic head, it is such as to give rise to the generation of electrical signals which are indicative of precise positioning of the head with respect to the selected track, or the error in positioning that may occur as between the head and the track.

An apparatus is known, which is provided with two stepping motors connected to a carriage on which the magnetic recording and reading head is mounted. One of the stepping motors, which has an elementary step equal to the radial distance between one recording track and the other is controlled in conventional manner, in a stepwise mode, to cause translatory movement of the magnetic head radially with respect to the disk. The second one of the stepping motors however has a much smaller elementary step and is operable to produce micro-movements of the carriage for the purposes of correcting the position reached by the carriage by operation of the first motor.

Since such apparatus, uses two stepping motors, one for coarse positioning and the other for fine positioning, it is inevitably very expensive.

SUMMARY OF THE INVENTION

The object of the present invention is to provide an apparatus which is capable of reading and recording information on a magnetic disk with tracks having a high degree of packing, which is very economical and at the same time highly reliable.

In accordance with that aim, the apparatus according to the invention is characterised in that the translation means comprise a single stepping motor capable of effecting both multiple rotational movements of an elementary step for displacing the magnetic head from one recording track to the other and micro-rotational movements which are sub-multiples of the elementary step, in response to the information recorded on the selected recording track.

BRIEF DESCRIPTION OF THE INVENTION

The invention will be described in more detail, by way of example, and with reference to the accompanying drawings, in which.

Figure 1:
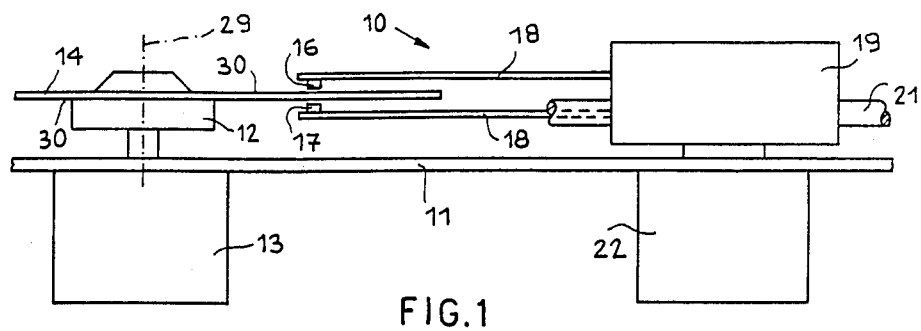
FIG. 1 is a side view of an apparatus embodying the invention.
Figure 10:
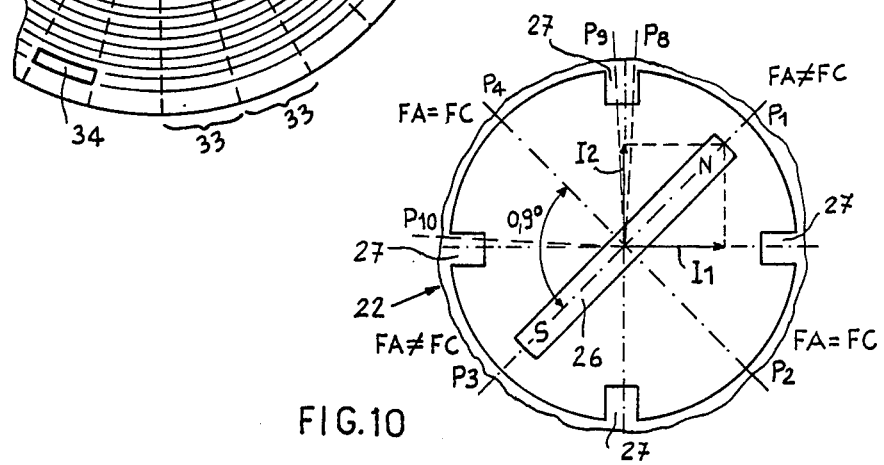
Figure 3:
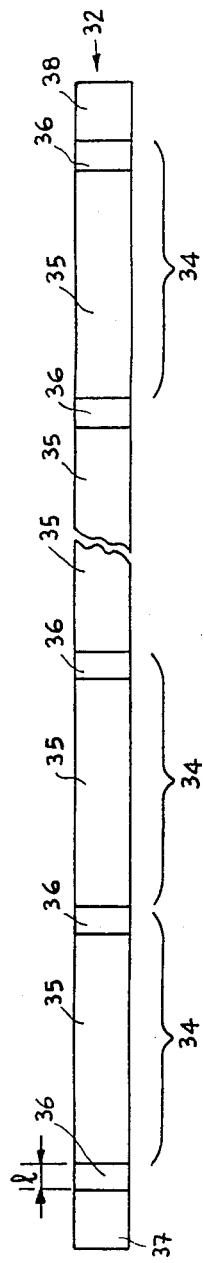
Figure 4:
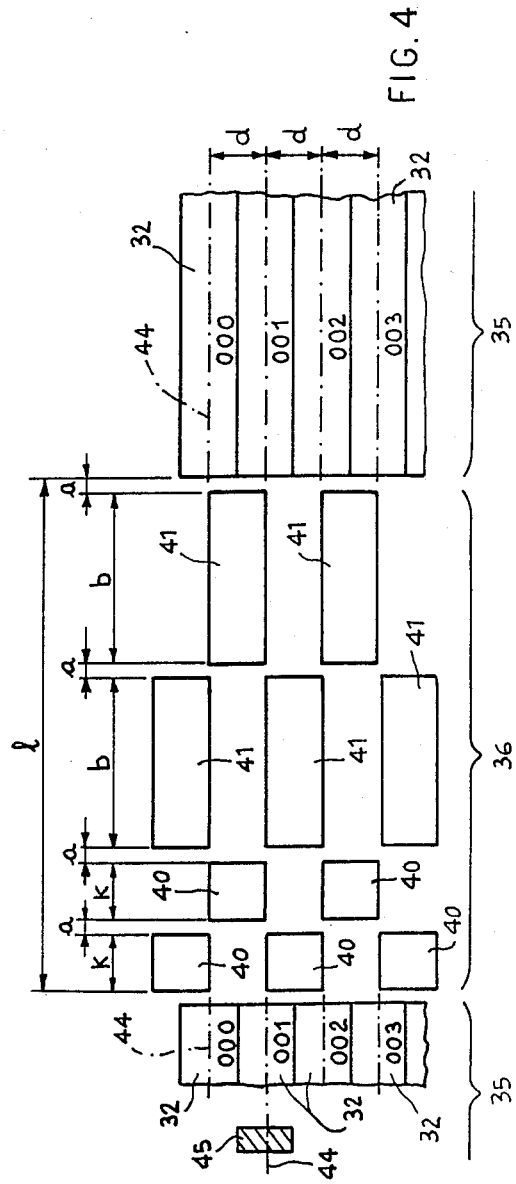
Figure 7:
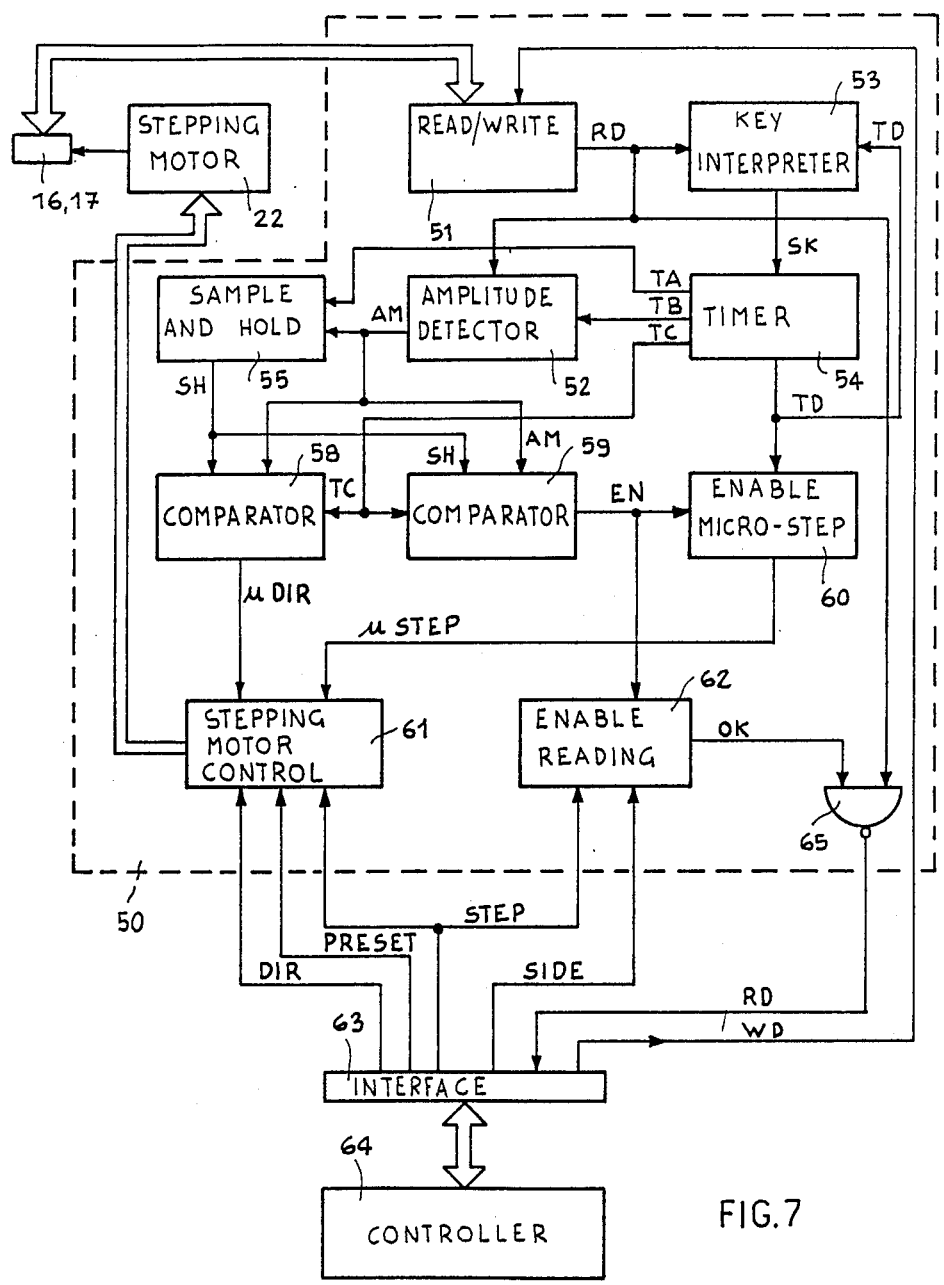
Figure 9:
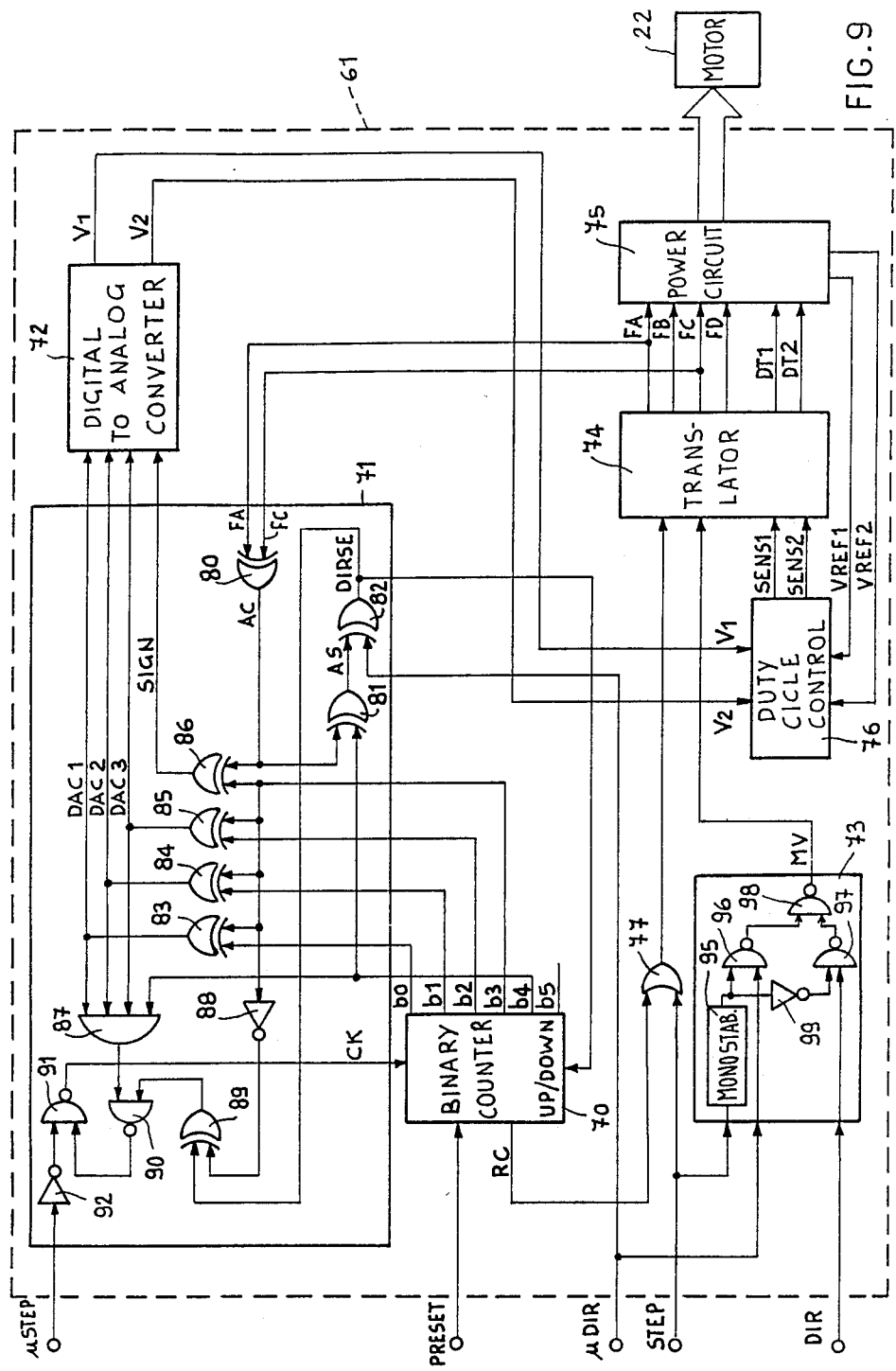

FIG. 3 is a diagrammatic representation of one of the recording tracks of a magnetic disk handled by the apparatus, FIG. 4 is a detail view on an enlarged scale of a part of the recording track shown in FIG. 3, FIG. 5 is a first diagram representing a first group of information which is prerecorded on the track shown in FIG. 3, FIG. 6 is a second diagram representing a second group of information which is prerecorded on the track shown in FIG. 3, FIG. 7 is a block diagram of an electrical circuit of the apparatus shown in FIG. 1, FIG. 8 is a third diagram representing the configuration of some electrical signals of the circuit shown in FIG. 7, FIG. 9 is an electrical diagram representing a detail of the circuit shown in FIG. 7, and FIG. 10 is a diagrammatic representation of one of the motors of the apparatus shown in FIG. 1.

DESCRIPTION OF THE PREFERRED EMBODIMENT

Referring to FIG. 1, an apparatus 10 according to the invention comprises a base 11 which rotatably mounts a spindle 12 connected to an electric motor 13 operable to rotate at least one magnetic disk 14 at constant angular velocity. The disk 14 may be for example of flexible type, known commercially as a "floppy disk".

Figure 2:
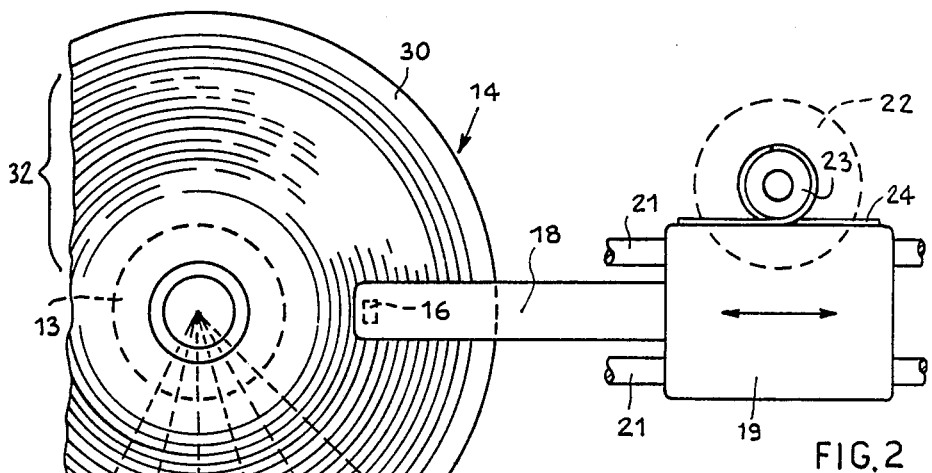
FIG. 2 is a plan view of the apparatus in FIG. 1.

Two magnetic heads 16 and 17 are mounted to the ends of two arms 18 of a carriage 19 which is slidable radially with respect to the disk 14 by means of guides 21 (FIGS. 1 and 2).

An electric motor 22 of the stepping type is fixed to the base 11 and is operable to control the displacement of the carriage 19 and the heads 16 and 17 by means of a hub 23 and a pair of flexible strips or blades 24 of known type, for example of the type described in our published Eurpoean Patent application No. EP 0,052,477.

The stepping motor 22 is of the two-pole type, is provided with a rotor 26 (FIG. 10) and pole pieces 27 energisable by means of currents $I_1$ and $I_2$, and is capable of performing 400 steps per revolution, that is to say, an elementary step corresponds to a rotary movement of 0.9°, to which corresponds a linear movement of the carriage 19 of 132 μm (FIG. 2).

Each magnetisable surface 30 of each disk 14 which can be recorded on and/or read by the apparatus 10 according to the invention is subdivided into a plurality of tracks 32 which are concentric with respect to the axis of rotation 29 of the disk 14; in addition each surface 30 is subdivided into a plurality of sectors 33. In a particular embodiment, on a floppy disk 14 with a standardised diameter of 5.25 inches, which is equal to about 134 mm, there are one hundred and sixty tracks 32, from 000 to 159, and there are twenty six sectors 33, from 01 to 26; in that way each surface 30 is subdivided into 4160 blocks 34, in each of which binary information can be recorded in serial form.

The distance "d" (see FIG. 4) between the centre lines 44 of the tracks 32 is 132 μm which is equal to the linear elementary movement of the carriage 19 produced by means of the stepping motor 22, whereby the packing density, expressed in terms of tracks per inch (tpi) is 192.

Each track 32 is about 130 μm in width, being substantially equal to the width of the air gap 45 of each of the magnetic heads 16 and 17.

In accordance with a characteristic aspect of the present invention, pilot information or servo information is prerecorded at the beginning of each of the 4160 blocks 34 (FIGS. 2, 3 and 4); such pilot information, when read by the magnetic heads 16 and 17, is suitable for producing micrometric rotary adjusting movements of the stepping motor 22 to maintain the magnetic heads 16 and 17 precisely aligned with the respective recording track 32 selected.

Each track 32 which is shown in FIG. 3 in linearly developed format, rather than around a circumference as is the real situation, is subdivided into 26 blocks 34, one for each sector 33, and each block 34 is in turn subdivided into a data block 35 and a service or servo block 36.

In addition, provided for each track 32 is a block 37 which is indicative of the beginning of the track (index gap) and a breather block 38 (track gap) in which no information is written. A further servo block 36 is provided between the index gap 37 and the adjoining data block 34; in that way there are twenty seven servo blocks 36 in each track 32.

Each servo block 36 carries the servo information recorded thereon, which comprises key information 40 and burst information 41. Both the information 40 and the information 41 are in turn divided into two groups which are disposed in succession relative to each other, but on opposite sides with respect to the centre lines 44 of the recording tracks 32.

The length "1" of each servo block 36 varies according to the radial position of the corresponding track 32 on the disk 14 but it is such as to provide that each servo block 36 can always be read by the magnetic head 16, 17 in a certain time $T_1$, for example in a time of 528 μsec. The lengths "k" and "b" of the individual groups of information 40 and 41 and the distance "a" between the groups 40 and 41 are such that each group 40 is read in a time $T_k$ of around 76 μsec, each group 41 is read in a time $T_b$ of around 156 μsec and the distance "a" is covered in a time $T_a$ of around 16 μsec. An example of the content of the information groups 40 and 41 is represented in FIGS. 5 and 6 respectively.

As can be seen therefrom, the key information 40 (see FIG. 5) in this example comprises a first series of pulses with a half-period $T_1$ of 1.5 μsec, which are followed by a second series of pulses with a half-period $T_2$ of 4 μsec, which in turn is followed by a third series of pulses with a half-period $T_3$ of 2 μsec, to finish with a final pulse with a half-period of $T_2$. The items of information 41 on the other hand are formed by a single series of pulses with a half-period $T_3$ of 2 μsec.

The apparatus 10 further comprises an electrical circuit 50 (see FIG. 7) which is operable to control the positioning of the magnetic heads 16 and 17 with respect to the recording tracks 32, by means of rotary movements of the stepping motor 22, both multiple movements of an elementary step and micrometric adjusting movements in response to the command coming from an external controller 64 which is known per se, by means of an interface 63, and the pilot information which is read by the heads 16 and 17 in the servo blocks 36, as will be described in detail hereinafter.

The circuit 50 comprises a circuit 51 for reading/writing the binary information, which is connected to the magnetic heads 16 and 17 and to the interface 63 from which it receives the data to be written WD and to which it passes the read data RD, a circuit 52 for detecting the amplitude of the signals RD coming from the circuit 51 and for generating corresponding signals AM, a circuit 53 for interpreting the key information 40, and a timer 54 for generating a series of timing signals TA, TB, TC and TD (see FIG. 8) and activated by an output signal SK from the circuit 53.

The circuit 50 (see FIG. 7) further comprises a sample and hold circuit 55 which is actuated by the timing signal TA and which is capable of sampling and storing the output signals AM from the circuit 52, a comparator circuit 58 which is actuated by the timing signal TC and which is capable of comparing the output signals SH from the circuit 55 to the output signals AM from the circuit 52 to generate a logic signal μDIR which determines whether the amplitude of the signals which are read on the first block 41 (FIG. 4) of burst information is greater than the amplitude of the signals which are read on the second block 41 of burst information (μDIR=1) or vice-versa (μDIR=0). In other words, the signal μDIR is at level 1 when the reading head 16 or 17 has been moved towards the first block 41 that it meets, during the rotary movement of the disk 14, wherein the term first block 41 is used to mean that which is most closely adjacent to the blocks 40 containing the key information.

A circuit 59 (see FIG. 7) which is also actuated by the timing signal TC is operable to compare the signals SH and AM to each other to determine if the difference between the amplitude values of the two signals, in relation to the amplitude of one of the two, is higher than a predetermined value to which there corresponds a positioning error of ±3 μm in respect of the magnetic head 16 or 17 with respect to the centre line 44 of the selected track 32 (see FIG. 4): in the affirmative situation, the circuit 59 (see FIG. 7) generates a logic enabling signal EN at level 1.

A circuit 60 is operable to generate a signal μSTEP indicative of the fact that a micro-rotational movement has to be performed by the stepping motor 22 in response to the timing and enabling signals TD and EN respectively outputted by the circuits 54 and 59.

The circuit 50 further comprises a circuit 61 for controlling and actuating the stepping motor 22 and a circuit 62 for generating an enabling signal OK for transmission of the data RD read by the circuit 51 to the interface unit 63 by means of a NAND-gate 65.

The enabling circuit 62 is operable to prevent the generation of the signal OK and thus to prevent the information RD read by the head 16 or 17 from passing to the interface 63, whenever the interface 63 itself supplies a signal STEP which is indicative of the fact that a movement from one track 32 to another is to be performed, and that the stepping motor 22 is thus to be operated, or a signal SIDE which is indicative of the fact that the surface 30 of the magnetic disk 14 on which the information is to be written or read is to be changed. In the absence of the signals STEP and SIDE, the signal OK can also be blocked by the signal EN which is indicative of an unacceptable positioning error of the head 16 or 17 which is in the reading mode, with respect to the corresponding selected recording track 32.

The circuit 61 (see FIGS. 7 and 9) in turn comprises a binary six-bit counter 70 ($b_0$–$b_5$), a tracking circuit 71 and a digital-analog converter 72. The inputs of the counter 70 receive a clock signal CK which is associated with the signal μSTEP, and an initial positioning signal PRESET directly from the interface 63. The circuit 71 receives the signal μDIR, the signal μSTEP and the outputs $b_0$–$b_4$ of the counter 70. The output $b_5$ of the counter 70 is unused.

The circuit 61 further comprises a circuit 73 for determining the mode (FULL STEP or MICRO STEP) with which the stepping motor 22 is to be the subject of pilot control, and the input thereof receives signals STEP and DIR from the interface 63 and the signal μDIR from the circuit 58. The circuit 73 is connected to a translator 74 which is operable to generate the phase signals FA, FB, FC and FD which, by means of a power circuit 75, are passed to the stepping motor 22. The translator 74 and the power circuit 75 control the energisation currents $I_1$ and $I_2$ (see FIG. 10) for the windings of the stepping motor 22 in the switching mode by means of two logic signals DT1 and DT2 (see FIG. 9).

Finally, the circuit 61 comprises a circuit 76 for adjusting the useful cycle (DUTY CYCLE) of the currents $I_1$ and $I_2$ to be passed to the stepping motor 22, and an OR-gate 77 whose input receives the signal STEP and a signal RC (RIPPLE COUNTER) outputted by the counter 70.

The circuit 76 is connected to the power circuit 75 to receive two reference voltages $V_{REF1}$ and $V_{REF2}$, the converter 72 to receive two adjusting voltages $V_1$ and $V_2$ and to the translator 74 to which it passes two control voltages SENS1 and SENS2, the values of which determine the duration of the pulses of the logic signals DT1 and DT2.

The circuit 71 (see FIG. 9) in turn comprises an EX-OR-gate 80 whose inputs receive the phase signals FA and FC outputted by the translator 74, an EX-OR-gate 81 whose inputs receive a signal AC generated by the gate 80 and the output signal $b_4$ from the counter 70, and an EX-OR-gate 82 whose inputs receive a signal AS generated by the gate 80 and the signal μDIR; the gate 82 generates a signal DIRSE for determining whether the counter 70 is to count in the up direction (DIRSE=0) or the down direction (DIRSE=1), as will be described hereinafter. The circuit 71 further comprises four EX-OR-gates 83, 84, 85 and 86, an input of which receives the output signal $b_3$ from the counter 70; the other input of the gates 83, 84, 85 and 86 respectively receive signals $b_0$, $b_1$ and $b_2$ from the counter 70 and the signal AC from the gate 80. An AND-gate 87 having four inputs receives the output signals DAC1, DAC2 and DAC3 from the gates 83, 84 and 85 and the signal $b_4$ from the counter 70. The signals DAC1, DAC2 and DAC3 and an output signal SIGN from the gate 86 are applied to the digital-analog converter 72. The signal $b_3$ which is inverted by an inverter 88 and the signal DIRSE are also the inputs of an EX-OR-gate 89, the output of which is connected to one of the two inputs of a NAND-gate 90, the other input of which has the output of the AND-gate 87 connected thereto. The output of the NAND-gate 90 is connected to one of the two inputs of another NAND-gate 91, the other input of which receives the signal μSTEP which is inverted by an inverter 92. The output of the NAND-gate 91 generates the clock signal CK for the binary counter 70.

The circuit 73 in turn comprises a monostable multivibrator 95 whose input receives the signal STEP from the interface 63 and a first NAND-gate 96, an input of which receives the signal μDIR, and having its other input connected to the output of the multivibrator 95. A second NAND-gate 97 has an input connected to the output of an inverter 99, having its input connected to the output of the multivibrator 95, and at the other input receives the signal DIR from the interface 63. A third NAND-gate 98 which has its inputs connected to the outputs of the gates 96 and 97 outputs a signal MV which is indicative of the direction in which the stepping motor 22 is to be rotated.

The circuit 61 is operable to produce both multiple rotary movements of one step, to move the magnetic heads 16 or 17 onto the selected recording track 32, operating in the FULL STEP mode, and micrometric rotary adjusting movements to position the magnetic head 16 or 17 in precisely centered relationship with the centre line 44 of the recording track 32 which has already been reached, by operating in the MICRO STEP mode. In both those modes, the currents $I_1$ and $I_2$ (FIG. 10) which energise the windings of the stepping motor 22 are supplied by the power circuit 75, by way of the translator 74.

The mode of operation of the apparatus 10 as described hereinbefore is as follows:

It will be assumed that a magnetic disk 14 (see FIGS. 1 and 2) has been positioned on the spindle 12 and that one of the magnetic heads 16 or 17 is to be positioned on a given recording track, starting from a rest position which is memorised in the controller 64.

The controller 64 (see FIG. 7) passes to the circuit 50, by means of the interface 63, the signals STEP and DIR which are indicative of the elementary steps that the motor 22 is to perform in order to reach the selected track 32 and the direction, clockwise or anticlockwise, in which the motor 22 is to rotate.

The signal STEP (see FIG. 9), on passing into the circuit 73, actuates the monostable multivibrator 95 with the result that the output of the latter goes to level 0 for a predetermined time sufficient to cause the motor 22 to perform a rotary movement of one step. With the output of the multivibrator 95 at level 0, the motor 22 is actuated in the FULL STEP mode and the signal MV assumes the same value as the signal DIR.

The controller 64 (FIG. 7) also supplies the circuit 50 with the signal PRESET which conditions the counter 70 to present at its outputs $b_0$–$b_4$ the starting configuration of 01000, with the least significant bit $b_0$ on the right and the most significant bit $b_4$ on the left. That configuration provides that the signals DAC1, DAC2 and DAC3 are all at level 1 and that the output voltages $V_1$ and $V_2$ from the converter 71 are equal to each other.

That means that, in that initial phase, the stepping motor 22 is pilot-controlled in conventional manner, with the energisation currents $I_1$ and $I_2$ (see FIG. 10) being maintained at the same value. That permits the rotor 26 of the motor 22 to stop at intermediate positions between the pole pieces 27 (positions $P_1$, $P_2$, $P_3$ and $P_4$ in FIG. 10). The stop positions $P_1$ and $P_3$, to which corresponds for example positioning of the heads 16 and 17 at the odd tracks 32, are attained when the phase signals FA and FC (FIG. 9) are different from each other, while the stop positions $P_2$ and $P_4$ (see FIG. 10) to which corresponds positioning of the heads 16 and 17 at the even tracks 32, are attained when the signals FA and FC are equal to each other.

It is assumed that, when pilot-controlled in that way, the stepping motor 22 has moved the head 16 or 17 to the recording track 001 (see FIG. 4). At that point it is the circuit 50 which directly provides for the micrometric pilot control of the stepping motor 22 to move the selected head 16 or 17 into precisely centered relationship with the track 32 which has been reached, and to hold it in that position.

The selected head 16 or 17 reads the information contained in the recording track and transfers it to the reading/writing circuit 51 which outputs the reading signals RD which are passed to the circuit 52 and to the circuit 53. When the latter recognises that the information read by the magnetic head 16 or 17 belongs to the key information 40 of a servo block 36, it puts the signal SK at level 1 (time $t_0$ in FIG. 8) and holds it at that level for the entire period of time $T_c$ required for reading the burst information of the two blocks 41.

The timing circuit 54 (FIGS. 7 and 8), before enabling the circuit 52 with the signal TB (time $t_3$), enables the circuit 55 with the signal TA for a period of time $T_s$ between the times $t_1$ and $t_2$. The circuit 52 is then enabled for a time $T_u$ between the times $t_3$ and $t_6$. The period of time $T_d$ between the times $t_0$ and $t_3$ is so selected that it is greater than the value of $T_k+2T_a$, and less than the value of $T_b+T_a-T_u$.

The circuit 55 is also enabled for a period of time $T_s$ between the times $t_4$ and $t_5$, during enablement of the circuit 52, so that the circuit 55 samples the signals AM received between the times $t_4$ and $t_5$, related to the values of the signals received between the times $t_1$ and $t_2$.

The timer circuit 54, at the time $t_7$ after a period of time $T_b$ from the time $t_6$, again enables the circuit 52 with the signal TB and, by means of the signal TC between the times $t_8$ and $t_9$ enables the comparison circuits 58 and 59. At the time $t_9$, when enablement of the circuits 58 and 59 is terminated, a negative pulse of the signal TD is generated, which at the time $t_{10}$ returns the signal SK to level 0, thus terminating the phase of reading the servo information 40 and 41 contained in the servo block 36.

If the circuit 59 detects that the difference between the amplitudes of the signals AM which are read in the first block 41 (times $t_4$–$t_5$) and those of the signals AM which are read in the second block 41 (times $t_8$–$t_9$) is smaller than the predetermined value and that there is therefore not a positioning error of greater than $\pm 3$ $\mu$m in respect of the magnetic head 16 or 17 relative to the centre line 44 of the selected track 001, no pulse $\mu$STEP is generated and the stepping motor 22 is held stationary in the position that it had previously reached. Concurrently, the signal OK is generated, which enables transfer of the information which is read in the data block 35 to the controller 64 by means of the interface 63.

If however the circuit 59 detects that the difference between the amplitudes of the signals AM is greater than the predetermined value, a negative pulse is generated on the signal $\mu$STEP, by means of the signal EN, and a micro-rotation of the stepping motor 22 is produced.

In particular, the signal $\mu$STEP (see FIG. 9), on going from level 1 to level 0, also causes the clock signal CK for the counter 70 to go to level 0, which changes the configuration of the counter outputs $b_0$–$b_4$.

The binary counter 70 is controlled to count in the up or down direction by the signal DIRSE which takes account of the level of the phase signals FA and FC with which the motor 22 was caused to perform the last step, and the level of the signal $\mu$DIR which is indicative of the direction in which the magnetic head 16 or 17 is displaced with respect to the centre line 44 of the selected track 001 (see FIG. 4).

As has been noted hereinbefore, the signal $\mu$DIR is at level 1 when the magnetic head 16 or 17 is displaced towards the first of the two burst information blocks 41 which it encounters.

It may be assumed for example that the magnetic head 16 or 17 is moved towards the first of the blocks 41 which it has read and that it is then displaced towards the track 002 with which it partially interferes; in that case the signal $\mu$DIR is at level 1.

The signal $\mu$DIR, by means of the circuit 73 (see FIG. 9), also conditions the signal MV. In fact, in that phase, as there are no pulses of the signal STEP, the signal MV assumes the same value as $\mu$DIR. Therefore, without pulses of the signal STEP, the circuit 73 is predisposed to provide for control of the stepping motor 22 in the MICRO STEP mode.

In the example set out above, with the magnetic head 16 or 17 positioned on the track 001, the phase signals FA and FC are different from each other; the signal AC is thus at level 1 and, the signal $b_4$ being initially at level 0, the signal AS is also at level 1. The signal $\mu$DIR being at level 1, the signal DIRSE is at level 0 and the counter 70 is operated to count in the up direction.

The outputs $b_0$–$b_3$ of the binary counter 70 change whenever a negative pulse of the signal $\mu$STEP is generated and, by means of the signals DAC1, DAC2, DAC3 and SIGN associated therewith, condition the converter 72 in such a way as to vary the values of the voltages $V_1$ and $V_2$. At each pulse of the signal $\mu$STEP the difference between $V_1$ and $V_2$ is incremented up to a certain point, and then reduced. In particular the outputs $b_0$, $b_1$ and $b_2$ are such as to determine the value that the difference between the voltages $V_1$ and $V_2$ is to assume, while the output $b_3$ is such as to determine the sign of the voltages $V_1$ and $V_2$.

The outputs $b_0$–$b_3$ are capable of taking on a configuration in sixteen different conditions, to which correspond sixteen different combinations of values of $V_1$ and $V_2$, whereby, within the limits of each of the elementary steps of 0.9° of the stepping motor 22, to which there corresponds a movement of the heads 16 and 17 from one recording track 32 to another, sixteen micro-steps may be performed, each of which corresponds to a movement of the carriage 19 and the magnetic heads 16 and 17 of around 8 $\mu$m.

For each of the micro-steps to be produced, the voltages $V_1$ and $V_2$ are varied in such a way that the current $I_1$ and $I_2$ which energise the windings of the motor 22 also change. In the hypothetical case envisaged, the voltage $V_2$ is increased and the voltage $V_1$ is reduced in such a way that in a similar fashion the current $I_1$ falls and the current $I_2$ rises (FIG. 10). In that way the rotor 26 of the motor 22 performs a rotary micro-motion in the anticlockwise direction and the heads 16 and 17 move towards the track 000 (see FIG. 4).

The above-indicated adjustment movements are carried out until the magnetic head detects that it is in precisely centered relationship to the centre line 44 of the selected track 001.

In accordance with a further feature of the present invention, the rotary micro-steps may be sixteen in one direction and sixteen in the opposite direction whereby the travel of the heads 16 and 17 in "searching for" precise positioning with respect to the centre line 44 of the selected track is of more or less a complete track, that is to say, $\pm 132$ $\mu$m.

In order to make that mode of operation possible, the binary counter 70 generates a pulse of the signal RC when eight micro-steps have been performed, in one direction or the other, from the initial position (for example position $P_1$ in FIG. 10).

It may be assumed for example that, in order to reach the optimum position of the magnetic head 16 or 17 on the selected track 001, the stepping motor 22 must perform ten micro-steps.

In the first operation of reading the servo information 40 and 41 the circuit 50 detects the positional error and a first pulse of the signal $\mu$STEP is generated: the voltage $V_1$ is reduced and the voltage $V_2$ is increased, in the manner described hereinbefore.

Reading of the servo information 40 and 41 contained in the servo block 36 subsequent to that which had been previously read also provides for detection of the positional error and a second pulse of the signal $\mu$STEP is generated so that a second pulse of the clock signal CK is applied to the counter 70 which again changes the configuration of its outputs. In particular, while the configuration of the outputs $b_0$, $b_1$ and $b_2$ changes to indicate, by means of the signals DAC1, DAC2 and DAC3, the new value that is to be assumed by the difference between the voltages $V_1$ and $V_2$, the output $b_3$ which is indicative of the fact that $V_1$ is greater than $V_2$ or vice-versa is intended not to change for the first eight clocks arriving at the counter. In that way, the difference between the energisation currents $I_1$ and $I_2$ is also further incremented.

Operation continues in a similar fashion until the eighth pulse of the signal $\mu$STEP is generated, and thus until the rotor 26 has performed eight micro-steps. As it performs the eight micro-step the rotor 26 moves with its pole N almost into a position of correspondence with the pole piece 27 intermediate between the stop positions $P_1$ and $P_4$ (position $P_8$ in FIG. 10), the current $I_1$ having become very small and the current $I_2$ in the meantime having become very great.

The subsequent pulse of the signal $\mu$STEP which causes the ninth clock pulse CK to be generated enables the counter 70 (see FIG. 9) to generate a pulse of the signal RC which, by means of the OR-gate 77, passes into the translator 74, causing a change in the configuration of the phase signals FA, FB, FC and FD, obviously taking account of the signal MV which is indicative of direction.

In other words, the pulse of the signal RC, just like a pulse of the signal STEP, would cause the motor 22 to perform an elementary step of 0.9° (see FIG. 10) until the rotor 26 moved from position $P_8$ to position $P_{10}$. However that step is not performed. In fact, since the phase signals FA and FC change due to the effect of the pulse of the signal RC (see FIG. 9), now being in the condition of FA=FC, the signal AC outputted from the gate 80 also changes in value. Concurrently with generation of the pulse of the signal RC, the counter 70 also changes the configuration of the outputs $b_0$–$b_3$. In particular the output $b_3$ changes in value with the result that the output signal SIGN from the gate 86 does not change in value. In that way the currents $I_1$ and $I_2$ which would be changed by virtue of the change in the signals FA and FC remain at the values that they had previously. In addition, with the change in the phase signals, the current $I_1$ also changes in direction while the current $I_2$ still continues with the same direction as before (see FIG. 10).

By virtue of those simultaneous changes, the rotor 26 of the motor 22, rather than performing a complete rotational movement of 0.9°, performs a micro-step and moves to a position slightly beyond the pole piece 27 between the stop positions $P_1$ and $P_4$ (position $P_9$ in FIG. 10). By suitable selecting the limit values of the currents $I_1$ and $I_2$, a micro-step of the rotor 26 which is equal to those produced previously is also effected in this case.

In addition, concurrently with the ninth clock CK, the counter 70 also changes the value of the output $b_4$ in such a way that, in spite of the change in the value of the signal AC, the signal DIRSE does not change in value.

The subsequent pulse of the signal $\mu$STEP generates the tenth clock pulse CK and conditions the counter 70 to change the values of the outputs $b_0$, $b_1$ and $b_2$ to reduce the difference between the voltages $V_1$ and $V_2$, to which there corresponds a similar reduction in the difference between the currents $I_1$ and $I_2$, to cause the rotor 26 of the motor 22 to perform a further micro-step in an anticlockwise direction, thus positioning the head 16 or 17 with respect to the centre line 44 of the selected track 001.

In that MICRO STEP mode, it would be possible to provide for pilot control of the motor 22 for n steps, for example for the entire travel movement of the carriage 19, but in the particular embodiment described herein, after sixteen micro-steps in each of the two directions of rotation, starting from the initial stop position ($P_1$ in the example stated), the circuit 71 is predisposed to block the generation of the clock pulses CK. The purpose of that is to ensure that a magnetic head 16 or 17 cannot, by error, be positioned on the centre line 44 of the tracks 32 which are immediately adjacent to the selected track (000 or 002 in the embodiment described), rather than on the actual selected track 001. To achieve that, after sixteen pulses have been received, the counter 70 is disposed with the outputs $b_0$–$b_4$ in the final configuration 10111 if the counter 70 was counting in the up direction (DIRSE=0) or in the configuration 11000 if the counter was counting in a down direction (DIRSE=1). In that way the output of the AND-gate 87 is also put to level 1 in each case while the output of the NAND-gate 89 goes to level 1 whereby generation of the pulses CK is blocked. Such blocking of the pulses CK occurs only if the signal $\mu$DIR does not change in level, otherwise, the signal DIRSE also changing in level, the block is removed.

The currents $I_1$ and $I_2$ which are modulated in that way are also kept as they are during subsequent actuation of the motor 22 in the FULL STEP mode. That means that, when the circuit 55 receives another pulse of the signal STEP from the interface 63, rotary movement through an elementary step of 0.9° occurs from the position previously reached with modulation of the currents $I_1$ and $I_2$.

That therefore means that there is a high probability that once the magnetic head 16 or 17 has been accurately positioned on one of the tracks 32, with movements of the carriage 19 which are a multiple of the elementary step, the same head 16 or 17 is already positioned at the centre of the new track selected.

Verification of the correct positioning of the magnetic head 16 or 17 with respect to the selected track 32 is effected twenty seven times for each revolution of the disk 14, once for each servo block 36 that the magnetic head 16 or 17 encounters. In that way, the position of the magnetic recording and reading head is continuously checked and possibly corrected, providing for highly precise and accurate tracking, which also makes it possible to remedy any errors in regard to eccentricity in the disk 14 or the spindle 12.

Whenever the circuit 50 detects correct positioning of the magnetic head 16 or 17 relative to the selected recording track, the binary information contained in the block 35 immediately following the servo block 36 which has been read, is read and transferred to the controller 64 or fresh data can be recorded in that block 35.

It will be clear therefore that the apparatus 10 comprises means 12 and 13 for rotating the disk 14, at least one magnetic head 16, 17 for recording and reading the information on the recording tracks 32, means 19, 22, 23 and 24 for translating the magnetic head 16 or 17 radially with respect to the disk 14 and positioning it with respect to a selected recording track, and means 50–62 for controlling the translation means, that the translation means comprise a single stepping motor 22 capable of effecting both multiple rotary movements of a step and rotary micro-movements which are submultiples of such step, and that the control means 50–62 are capable of controlling the rotary micro-movements of the stepping motor in response to the information recorded on the selected recording track.

It will be appreciated that the apparatus as described hereinbefore may be the subject of modifications and addition of parts, without thereby departing from the scope of the claims.

For example, the circuit 50 for controlling the stepping motor 22, rather than being on an apparatus for recording and reading information on a magnetic disk, may be applied to an apparatus for magnetic cards or tapes in which the recording tracks, rather than being circular and concentric, are straight and parallel to each other.

We claim:

1. In an apparatus for recording and reading information on a magnetic disk provided with a plurality of concentric recording tracks, comprising means for rotating the disk; at least one magnetic head for recording and reading information on the recording tracks; means for selectively translating the magnetic head radially with respect to the disk to position the head at a selected recording track; and control means for actuating said translation means, wherein the disk is subdivided into a plurality of circular sectors which define a plurality of blocks of information for each recording track and wherein for each of the blocks there is provided a service zone in which binary information is prerecorded and a useful zone in which information can be recorded and read by means of the magnetic head, and the combination comprising:

said translation means comprises a stepping motor having its rotor operatively connected with said magnetic head and capable of effecting both multiple rotary movements of an elementary step to move the magnetic head from one recording track to another, and rotary micro-movements which are a submultiple of the elementary step;

said prerecorded binary information comprises burst information subdivided into two groups disposed one after the other and on opposite sides with respect to a center line of the respective recording track; and said control means further comprises a comparator circuit for comparing signals which are read by the magnetic head in the first group of burst information with signals read in the second group of burst information to generate a logic signal (USTEP) indicative of the fact that a positioning error greater than a predetermined non-zero value exists between the magnetic head and the selected recording track, and means responsive to said logic signal to provide for consequential performance of a micro-step of the rotor of said stepping motor to reduce said positioning error, wherein said control means further comprises an amplitude detector circuit for detecting the amplitude of the burst information read by said magnetic head; a sample and hold circuit for sampling and holding the amplitude of the first burst information read by the head and wherein said comparator circuit is time actuatable to compare the amplitude of the second burst information read by said magnetic head with the amplitude of said first burst information heldby said sample and hold circuit.

2. Apparatus according to claim 1, wherein said control means further comprises a translator circuit and a circuit for adjusting duty cycles of energisation currents for the stepping motor, the translator circuit
    being capable of switching said energization currents through energisation phases to produce the elementary steps and the duty cycle adjusting circuit being capable of modulating the energisation currents to produce the micro-steps.

3. Apparatus according to claim 1, further comprising a controller which determines how many steps the magnetic head has to move to reach a selected track and generates control pulses (STEP) associated to said steps, wherein said control means further comprises an actuation circuit operable to cause the rotor of said stepping motor to perform the multiple rotary movements of an elementary step in response to said control pulses (UTEP) and additive to said micro-steps.

4. Apparatus according to claim 1, wherein said control means further comprises a translator circuit and a circuit for adjusting the duty cycles of energisation currents for the stepping motor, the translator circuit (74) being capable of switching said currents through energisation phases to produce the elementary steps and the duty cycle adjusting circuit being capable of modulating the stepping motor energisation currents to produce the micro-steps and wherein the actuation circuit comprises a binary counter
    having its outputs connected to a digital-analog converter which is operable to generate at least one adjusting voltage ($V_1$, $V_2$) for the duty cycle adjusting circuit and wherein the logic signal (STEP) generated by the comparator circuit provides the clock pulses for the binary counter.

5. Apparatus according to claim 1, wherein the binary information of said service zone further comprises key information disposed at the beginning of each service zone, before said burst information and wherein said control means further comprises recognizing means for recognizing the key information read by said magnetic head and supplying a strobe signal (SK) indicative of recognizing said key information, and timing means responsive to said strobe signal for timing said sample and hold circuit, said amplitude detector circuit, and said comparator circuit.

6. Apparatus according to claim 5, wherein said key information comprises a first key information aligned with said first burst information and a second key information aligned with said second burst information.

7. In an apparatus for recording and reading information on a magnetic disk provided with a plurality of concentric recording tracks, comprising means for rotating the disk; at least one magnetic head for recording and reading information on the recording tracks; means for selectively translating the magnetic head radially with respect to the disk to position the head at a selected recording track; and control means for actuating said translation means, wherein the disk is subdivided into a plurality of circular sectors which define a plurality of blocks of information for each recording track and wherein for each of the blocks there is provided a service zone in which binary information is prerecorded and a useful zone in which information can be recorded and read by means of the magnetic head, and the combination comprising:

said translation means comprises a stepping motor having its rotor operatively connected with said magnetic head and capable of effecting both multiple rotary movements of an elementary step to move the magnetic head from one recording track to another, and rotary micro-movements which are a submultiple of the elementary step;

said prerecorded binary information comprises burst information subdivided into two groups disposed one after the other and on opposite sides with respect to a center line of the respective recording track; and said control means further comprises a comparator circuit for comparing signals which are read by the magnetic head in the first group of burst information with signals read in the second 8. Apparatus according to claim 7, further comprising a controller which determines how many steps the magnetic head has to move to reach a selected track and generates control pulses (STEP) associated to said steps, and wherein said translator circuit means causes the rotor of said stepping motor to perform multiple rotary movements of an elementary step in response to said control pulses (STEP) from said controller, starting from the last micro-step reached by said rotor.

9. In an apparatus for recording and reading information on a magnetic disk provided with a plurality of concentric recording tracks, comprising means for rotating the disk; at least one magnetic head for recording and reading information on the recording tracks; a stepping motor having the rotor operatively connected with said at least one magnetic head for selectively translating the magnetic head radially with respect to the disk to position the head at a selected recording track; and control means for actuating said stepping motor to cause its rotor to effect both multiple rotary movements of an elementary step to move the magnetic head from one recording track to another, and rotary micro-movements which are a submultiple of the elementary step for aligning the magnetic head with a center line of the selected recording track, wherein the stepping motor has a plurality of poles and associated windings, wherein two of said windings are energizable by an energization current according to a plurality of configurations to define the elementary steps of said rotor, wherein each micro-step of the rotor toward a given pole and from another pole adjacent to said given pole is obtained by increasing the energization current of the winding of said given pole and decreasing the energization current of the winding of said other pole, and wherein said control means further comprises:

a translator circuit means actuatable for switching the energization current between said windings to modify said configurations and advancing said rotor through said elementary step; and reconfiguration means responsive to a maximum number of microsteps of said rotor toward said given pole for actuating said translator circuit means to switch the energization current of said windings according to a new configuration enabling execution of microsteps of said rotor away from said given pole and toward another adjacent pole opposite to said other pole with respect to said given pole.

10. Apparatus according to claim 9, wherein said reconfiguration means comprises counting means for up and down counting microstep signals associated with the micro-steps of said rotor toward said given pole and away from said given pole, respectively, and wherein said translator circuit is actuated in response of a count signal of said counting means indicative of a predetermined count of said micro-step signals.

11. Apparatus according to claim 10, further comprising a controller which determines how many steps the magnetic head has to move to reach a selected track and generates control pulses (STEP) associated to said steps, and wherein said translator circuit switches the increased and decreased energization current between said windings in response to said control pulses to the new configuration without changing the content of said counting means.

12. Apparatus according to claim 10, wherein said control means further comprises a circuit for adjusting the duty cycles of the energization current for the windings of said stepping motor, wherein the duty cycle adjusting circuit is capable of modulating said energization current to produce said micro-steps, and wherein a digital-analog converter is operable in response to said count signal to generate at least one adjusting voltage for said duty cycle adjusting circuit.

13. An apparatus for recording the reading information on a magnetic disk provided with a plurality of concentric recording tracks, comprising means for rotating the disk at a given angular velocity; at least one magnetic head for recording and reading information on the recording tracks; means for selectively translating the magnetic head radially with respect to the disk to position the head at a selected recording track; and control means for actuating said translating means, wherein the disk is subdivided into a plurality of sectors which define a plurality of blocks of information for each recording track and wherein for each of the blocks there is provided a service zone in which binary information is prerecorded and a useful zone in which information can be recorded and read by means of the magnetic head, and the combination comprising:

said prerecorded binary information comprises key information and burst information, wherein said burst information are disposed between the key information and the useful zone, wherein each of said key information and burst information is subdivided into two groups of key information and burst information, respectively, which are disposed one after the other and on opposite sides with respect to a center line of the respective recording track and wherein the key information and the burst information of each group are aligned with each other for enabling said head to read correctly at least one of said two groups of said key information also if said head is largely offset with respect to said center line of the respective recording track; and said control means comprises recognizing means for recognizing said key information and generating a key information signal (SK) in response to a correctly read signal of at least one of said two group of said key information;

timing circuit means responsive to a first said key information signal correctly read for generating a first and a second reading signal (TB) and a sample and hold signal (TS), wherein the first and the second reading signals are synchronous with the first and the second burst information, respectively;

an amplitude detector means responsive to said first and second reading signal for reading out an amplitude signal indicative of the amplitude of the burst information read by the head;

a sample and hold circuit connected with said timing circuit means and said amplitude detector means and responsive to said sample and hold signal to sample and hold the amplitude signal of the first burst information as read out from said amplitude detector means;

comparator means for comparing the amplitude signal of the first burst information held by the sample and hold circuit with the amplitude signal of the second burst information read out from said amplitude detector means and generating an error logic signal indicative of a positioning error of said magnetic head with respect to the center line of the selected recording track; and means connected with said translating means and responsive to said error signal for reducing the positioning error of said magnetic head.

14. An apparatus according to claim 13, wherein the error signal of said comparator means is a logic signal indicative of the fact that said position error is greater than a predetermined value, and wherein said error correcting means responds to said logic signal to translate said head through a predetermined micro-step.

* * * * *

UNITED STATES PATENT AND TRADEMARK OFFICE
CERTIFICATE OF CORRECTION

PATENT NO. :  4,775,902

DATED  :  October, 4, 1988

INVENTOR(S) :  Antonio Trovato et al.

It is certified that error appears in the above-identified patent and that said Letters Patent is hereby corrected as shown below:

IN THE CLAIMS

In claim 7, column 13, line 33, after "second", insert --group of burst information to generate a logic signal (USTEP) indicative of the fact that a positioning error greater than a predetermined value exists between the magnetic head and the selected recording track, and means responsive to said logic signal to provide for consequential performance of a micro-step of the rotor of said stepping motor to reduce said positioning error, wherein the stepping motor has a plurality of poles and associated windings, wherein two of said windings are energizable by an energization current according to a plurality of configurations to define the elementary steps of said rotor, wherein each micro-step of the rotor toward a given pole and from another pole adjacent to said given pole is obtained by increasing the energization current in the winding of said given pole and decreasing the energization current in the winding of said other pole, wherein each micro-step is associated with a micro-step signal and wherein said control means further comprises:

UNITED STATES PATENT AND TRADEMARK OFFICE
CERTIFICATE OF CORRECTION

PATENT NO. : 4,775,902

DATED : October, 4, 1988

INVENTOR(S) : Antonio Trovato et al.

It is certified that error appears in the above-identified patent and that said Letters Patent is hereby corrected as shown below:

a translator circuit means actuatable for switching the energization current between said windings to modify said configurations and advancing said rotor through said elementary step;

counting means for up and down counting each micro-step signal associated with each micro-step of said rotor toward said given pole and away from said given pole, respectively; and means responsive to a maximum count of said counting means for actuating said translator circuit means to switch the energization current of said windings according to a new configuration enabling the execution of micro-steps of said rotor away from said given pole and toward another

UNITED STATES PATENT AND TRADEMARK OFFICE
CERTIFICATE OF CORRECTION

PATENT NO. : 4,775,902

DATED : October 4, 1988

INVENTOR(S) : Antonio Trovato, et al

It is certified that error appears in the above-identified patent and that said Letters Patent is hereby corrected as shown below:

adjacent further pole opposite to said other pole with repect to said given pole.--

Signed and Sealed this

Twenty-fourth Day of September, 1991

Attest:

HARRY F. MANBECK, JR.

*Attesting Officer*    Commissioner of Patents and Trademarks